US011286703B2

(12) United States Patent
Jayaraj et al.

(10) Patent No.: US 11,286,703 B2
(45) Date of Patent: Mar. 29, 2022

(54) DRIVE ARRANGEMENT FOR A SUNROOF AND A SUN BLIND OF A VEHICLE

(71) Applicant: WEBASTO SE, Stockdorf (DE)

(72) Inventors: Rajesh Jayaraj, Stockdorf (DE); Gunther Helm, Stockdorf (DE); Levente Gyerko, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/097,883

(22) Filed: Nov. 13, 2020

(65) Prior Publication Data

US 2021/0108456 A1    Apr. 15, 2021

(30) Foreign Application Priority Data

Oct. 14, 2019   (DE) ..................... 10 2019 127 598.9

(51) Int. Cl.
*E05F 15/676*    (2015.01)
*B60J 7/057*    (2006.01)

(52) U.S. Cl.
CPC .......... *E05F 15/676* (2015.01); *B60J 7/0573* (2013.01); *E05Y 2800/205* (2013.01); *E05Y 2900/542* (2013.01)

(58) Field of Classification Search
CPC ................. E05Y 2900/542; E05Y 2800/205
USPC ........................................ 296/214, 219, 223
See application file for complete search history.

(56) References Cited

U.S. PATENT DOCUMENTS 10,622,865 B2 *   4/2020   Kimura ................... H02K 5/24
2016/0288631 A1    10/2016   Parkila et al.

FOREIGN PATENT DOCUMENTS

| DE | 3829405 A1 * | 3/1990 | ............ G05B 19/23 |
| DE | 19849837 C2 | 2/2003 | |
| DE | 102008035091 A1 * | 2/2010 | ............ B64C 27/14 |
| DE | 102013200359 A1 * | 7/2014 | ......... F16H 57/0006 |
| WO | 2007041988 A2 | 4/2007 | |
| WO | 2019158407 A1 | 8/2019 | |

OTHER PUBLICATIONS

Niewiadomski et al., "Actuating device for parts of motor vehicles movable by electric motors", Mar. 8, 1990, European Patent Office, Edition: DE3829405A1 (Year: 1990).*

Neitzke, "Drive device for use in transportation unit for independent driving of two bodies arranged coaxially with each other, has two stators, two rotors and holder for twist-proof fastening of drive device", Nov. 2, 2010, German Patent Office, Edition: DE102008035091A1 (Year: 2010).*

(Continued)

*Primary Examiner* — Dennis H Pedder
*Assistant Examiner* — Joyce Eileen Hill
(74) *Attorney, Agent, or Firm* — Quarles & Brady LLP

(57) ABSTRACT

An electromotive drive arrangement for a transparent sunroof and a sun blind, arranged beneath the sunroof, of a vehicle, comprising one motor/gearing unit for actuating the sunroof and one motor/gearing unit for actuating the sun blind, wherein the motor/gearing units are fitted at the edge of the roof cut-out for the sunroof, characterized in that the two motor/gearing units are combined into one motor/gearing block.

6 Claims, 3 Drawing Sheets

(56) References Cited

OTHER PUBLICATIONS

Reichmann, "Gear Box Drive Unit for Sliding Roof in Motor Car, Has Counter Gear Tooth Portion and Gear Unit That Are Shifted Together During the Movement of Transmission Element Which Is Provided in Active Connection With Support Element", Jul. 31, 2014, European Patent Office, Edition: DE102013200359A1 (Year: 2014).*
German Patent and Trademark Office, Examination Report, Application No. 102019127598.9, dated Dec. 10, 2020, 5 pages.

* cited by examiner

DRIVE ARRANGEMENT FOR A SUNROOF AND A SUN BLIND OF A VEHICLE

CROSS-REFERENCE TO RELATED APPLICATIONS

This application claims priority to German Patent Application DE 10 2019 127 598.9, filed on Oct. 14, 2019, which is hereby incorporated by reference in its entirety for all purposes.

The disclosure relates to an electromotive drive arrangement for a transparent sunroof and a sun blind, arranged beneath the sunroof, of a vehicle, comprising one motor/gearing unit for actuating the sunroof and one motor/gearing unit for actuating the sun blind, wherein the motor/gearing units are fitted at the edge of the roof cut-out for the sunroof.

A drive arrangement of this kind is thus based on two motor/gearing units for actuating the sunroof and the sun blind. In an alternative, a single motor/gearing unit is provided which drives the two elements jointly by means of Bowden cables that can be activated separately.

FIGS. 1 to 4 show typical configurations of the electromotive drive arrangement named at the outset having separate motor/gearing units for the sunroof and the sun blind and having a single motor gearing arrangement.

Figure 1:
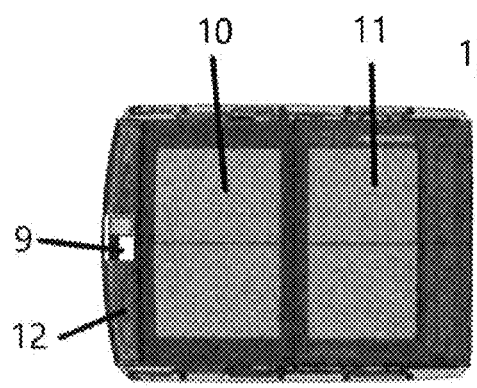
Figure 4:
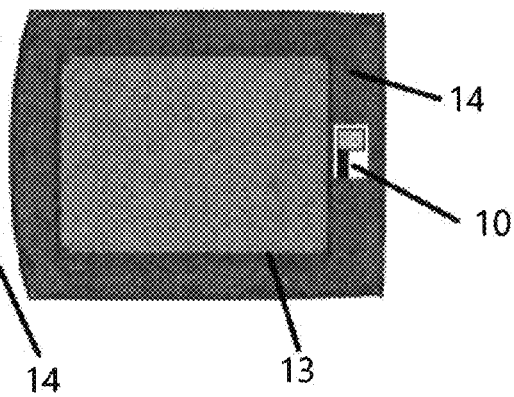

FIGS. 1 and 4 show the variants of the drive arrangement with a single motor/gearing unit 9 for actuating both a two-part sunroof 10, 11 and a sun blind (not shown). In FIG. 1 the motor/gearing unit 10 comes to rest in the centre of a front edge region 12 of a rectangular roof cut-out 13, which in this case is closed completely by the sunroof 10, 11, and in FIG. 4 it comes to rest in the centre of a rear edge region 14 of the roof cut-out 13, which in this case is fully open. The sunroof and sun blind are actuated by means of Bowden cables driven by the motor/gearing unit, wherein the sun blind is typically advanced in the rolling-up direction with assistance from a return spring device.

Figure 2:
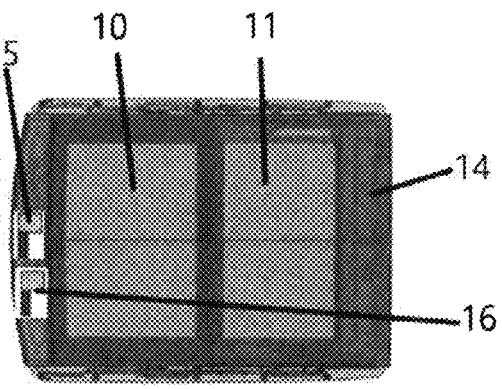
Figure 3:
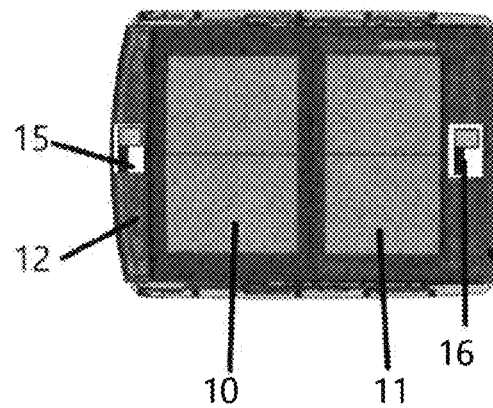

In FIGS. 2 and 3, a drive arrangement having two separate motor/gearing units 15 and 16 is used to drive the two-part sunroof 10, 11 and the sun blind. In FIG. 2, the two motor/gearing units 15 and 16 come to rest next to one another to the left of the centre of the front edge region 14 of the roof cut-out 13. In FIG. 3, the motor gearing arrangement 15 for driving the sunroof 10, 11 is arranged in the centre of the front edge region 12 of the roof cut-out 13, whereas the motor gearing arrangement 16 for driving the sun blind is arranged in the centre of the rear edge region 14 of the roof cut-out 13.

The disadvantage of the variant having separate motor/gearing units 10, 11 for the sunroof 10, 11 and the sun blind, as shown in FIG. 3, is that a relatively long cable run is required to power the electric motor for the arrangement 16 at the rear. In addition, the free headroom for passengers in the back seats of the vehicle is restricted by the sun blind drive arrangement arranged there.

The disadvantage of the variant shown in FIG. 2 in which separate motor/gearing units 15, 16 for the sunroof 10, 11 and the sun blind are positioned next to one another in the front edge region 14 of the roof cut-out 13 is that the controller for the arrangements 15, 16 is provided at that point of the roof cut-out and takes up so much space that it is not always guaranteed that there is enough installation space left for the gearing/motor arrangements 15, 16.

The disadvantage of the two variants shown in FIGS. 2 and 3 having separate motor/gearing units 15, 16 for the sunroof 10, 11 and the sun blind is that separate plug connectors are required for the two electric motors of the arrangements 10, 11, and that the electromotive drive arrangement does not block the light entering the rear region of the roof cut-out.

Therefore, there is a need for an electromotive drive arrangement for a transparent sunroof and a sun blind, arranged beneath the sunroof, of a vehicle of the type named at the outset that avoids the named disadvantages of conventional arrangements of this kind.

The object of the present disclosure is thus to provide an electromotive drive arrangement for a transparent sunroof and a sun blind, arranged beneath the sunroof, of a vehicle of the type named at the outset that avoids both long cable runs and a large number of plug connectors, that requires less installation space than conventional drive arrangements, and that does not block the light for passengers in the rear vehicle region.

This object is achieved by the features of claim 1. The dependent claims set out advantageous developments of the disclosure.

The disclosure thus provides an electromotive drive arrangement for a transparent sunroof and a sun blind, arranged beneath the sunroof, of a vehicle, comprising one motor/gearing unit for actuating the sunroof and one motor/gearing unit for actuating the sun blind, wherein the motor/gearing units are fitted at the edge of the roof cut-out for the sunroof, and wherein the two motor/gearing units are combined into one motor/gearing block.

Combining the two motor/gearing units into one block achieves a compact design of the drive arrangement for the sunroof and the sun blind that allows the arrangement to be housed in a space-saving manner, preferably in the front region of the vehicle roof opening, thereby preventing the installation space for the arrangement and its controller from being insufficient in cases where the opening for the sunroof is narrow. In addition, positioning the entire drive arrangement in the front edge region of the opening ensures that the problem of reduced light for passengers in the back seats of the vehicle does not arise. Lastly, it is possible to omit, in a cost-effective manner, long cable runs for supplying power to and controlling the drive arrangement and the large number of plug connectors required when the roller drive arrangement is arranged separately in the rear region of the vehicle roof opening. The weight saving achieved by combining the two motor/gearing units into a common block should not be underestimated.

Advantageously, the electric motors of the motor/gearing units are opposite one another in a contiguous manner in the motor/gearing block.

To optimize the compact shape of the drive arrangement, the motor/gearing units are arranged in the motor/gearing block asymmetrically with respect to one another such that the stators of the two motors come to rest next to one another while extending in parallel with one another.

Advantageously, the stators of the two electric motors are housed, in particular in a form-fitting manner, in a common injection-moulded part. The noise caused by actuation of the electric motors is thereby greatly muffled. A similar advantage is achieved when the gearings of the two motor/gearing units are contained in respective further injection-moulded parts, which are connected to the common motor-stator injection-moulded part on either side thereof.

The injection-moulded parts preferably consist of plastics material or alternatively of aluminium. Preferably, the output pinions of the gearings of the two motor/gearing units come to rest on opposite sides of the motor/gearing block in a manner protruding therefrom. This favours the coupling of the driving cables for the sunroof and the sun blind.

Figure 5:
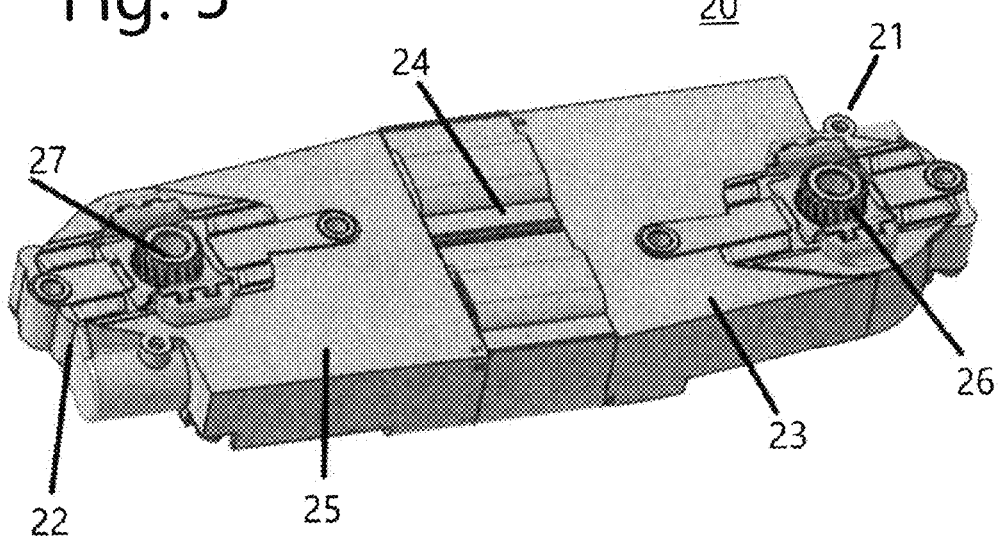
Figure 6:
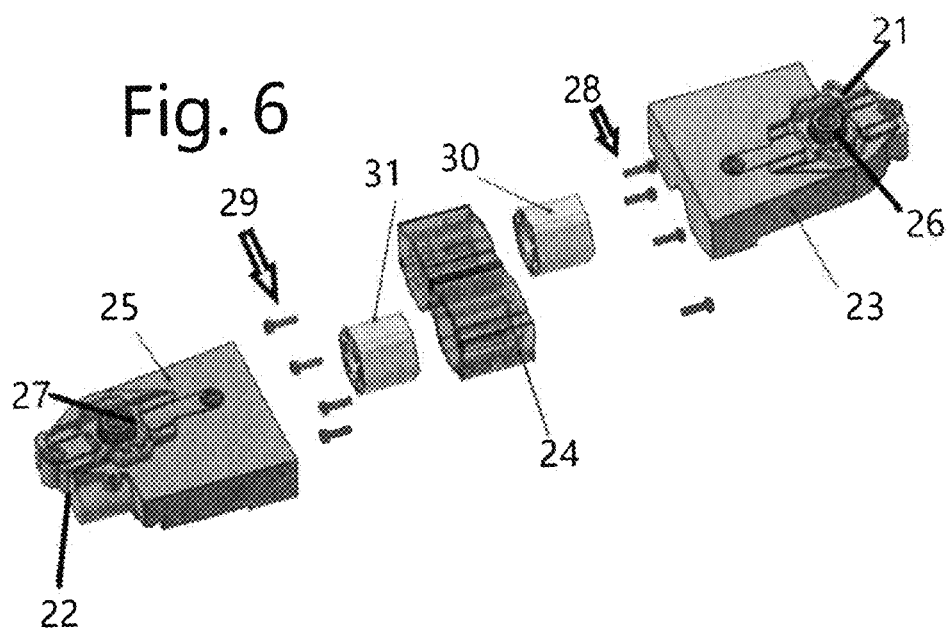
Figure 7:
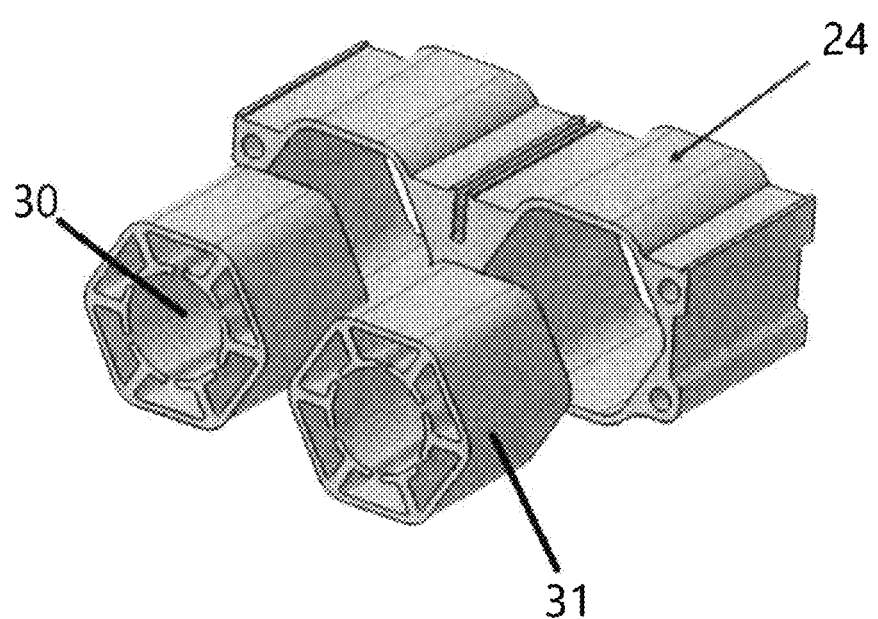

The disclosure will be explained in more detail below with reference to the drawings, in which:

FIG. 1 shows a roof cut-out of a vehicle having a closed two-part sunroof for opening and closing the roof cut-out and having an electromotive drive arrangement according to the state of the art, which comprises a single motor/gearing unit for actuating the sunroof and a sun blind (not shown), which unit comes to rest in the front region of the roof cut-out, FIG. 2 shows an alternative first embodiment of an electromotive drive arrangement according to the state of the art compared with FIG. 1, having two motor/gearing units for separately actuating the sunroof and sun blind, wherein the two motor/gearing units come to rest together in the front region of the roof cut-out, FIG. 3 shows a variation of the arrangement from FIG. 2, having one motor/gearing unit arranged in the front region of the roof cut-out and one arranged in the rear region of the roof cut-out, FIG. 4 shows the arrangement of FIG. 1 with the sunroof open, wherein the single gearing/motor arrangement comes to rest in the rear region of the roof cut-out, FIG. 5 is a top view of an electromotive drive arrangement for a sunroof and sun blind of a vehicle, comprising two gearing/motor arrangements for separately actuating the sunroof and sun blind, wherein the two motor/gearing units are combined into one motor/gearing block, FIG. 6 is an exploded view of the arrangement from FIG. 6, and FIG. 7 is a view of the stators of the two motors of the motor/gearing block from FIGS. 5 and 6, the stators being form-fittingly contained in a common injection-moulded part.

FIGS. 1 to 4 have already been explained in the introductory part in relation to the state of the art.

Embodiments of the electromotive drive arrangement according to the disclosure for a transparent sunroof and a sun blind, arranged beneath the sunroof, of a vehicle will now be explained with reference to FIGS. 5 to 7.

The electromotive drive arrangement in FIGS. 5 to 7 serves to drive a transparent sunroof and a sun blind, arranged beneath the sunroof, of a vehicle such as a car. This arrangement comprises one motor/gearing unit 21 for actuating the vehicle sunroof and one motor/gearing unit 22 for actuating the sun blind, wherein the motor/gearing units 21 and 22 are fitted at the edge of the roof cut-out for the sunroof. FIG. 2 shows a drive arrangement of this kind having two separate motor/gearing units 15 and 16 arranged in the front edge region of a vehicle roof cut-out. Unlike the motor/gearing units 15 and 16, which are formed and arranged separately from one another, the motor/gearing units 21 and 22 are combined to form one motor/gearing block 20.

This block 20 comprises a casing consisting of three flat injection-moulded parts 23, 24 and 25, which accommodate, preferably at least in part in a form-fitting manner, the components of the motor/gearing units 21 and 22 apart from gearing output pinions 26, 27, which protrude beyond the injection-moulded parts 23, 25. As shown in FIG. 6, the three injection-moulded parts are interconnected by means of screws 28, 29, which pass through holes in flange protrusions on the opposite sides of the injection-moulded parts 23 and 25 and engage in threaded holes in the central injection-moulded part.

The injection-moulded parts 23, 24 and 25 preferably consist of plastics material or alternatively of aluminium.

Apart from the stators 30 and 31 and the rotors (enclosed by same, not shown) of the electric motors of the motor/gearing units 21 and 22, these units are accommodated in the two outer casing injection-moulded parts. The stators 30 and 31, on the other hand, protrude on the opposite sides of the injection-moulded parts and come to rest completely in the central casing injection-moulded part in a form-fitting manner, with their longitudinal central axes (=axes of rotation of the rotors) oriented in parallel with one another. This stator arrangement is the reason for the compact shape of the electromotive drive arrangement in the longitudinal direction of the arrangement, and, compared with the state of the art shown in FIG. 2, in which the motor/gearing units 15 and 16 are entirely separate from one another and arranged in separate casings, this shape ensures a reduced installation space of the arrangement for the benefit of the controller, which comes to rest at an axial offset from the arrangement.

LIST OF REFERENCE NUMBERS 9 motor/gearing unit
10, 11 sunroof
12 front edge region
13 roof cut-out
14 rear edge region
15, 16 motor/gearing unit
20 motor/gearing block
21, 22 motor/gearing unit
23, 24, 25 injection-moulded part
26, 27 gearing output pinion
28, 29 screws
30, 31 stator

The invention claimed is:

1. Electromotive drive arrangement for a transparent sunroof and a sun blind, arranged beneath the sunroof, of a vehicle, comprising one motor/gearing unit for actuating the sunroof and one motor/gearing unit for actuating the sun blind, wherein the motor/gearing units are fitted at the edge of the roof cut-out for the sunroof, wherein the two motor/gearing units are combined into one motor/gearing block, and wherein the stators of the two motors are housed in a common injection-moulded part, and wherein the gearings of the two motor/units are contained in respective further injection-moulded parts, which are connected to the common motor-stator injection-moulded part on either side thereof.

2. Drive arrangement according to claim 1, wherein the electric motors of the motor/gearing units are opposite one another in the motor/gearing block.

3. Drive arrangement according to claim 2, wherein the motor/gearing units are arranged in the motor/gearing block asymmetrically with respect to one another such that the stators of the two motors come to rest next to one another while extending in parallel with one another.

4. Drive arrangement according to claim 1, wherein the injection-moulded parts consist of plastics material.

5. Drive arrangement according to claim 1, wherein the injection-moulded parts consist of aluminum.

6. Drive arrangement according to claim 1, wherein output pinions of the gearings of the two motor/gearing units come to rest on the same side of the motor/gearing block in a manner protruding therefrom.

* * * * *